United States Patent
Lewis et al.

(10) Patent No.: US 9,267,231 B2
(45) Date of Patent: Feb. 23, 2016

(54) METHODS FOR JOINING STRIPS OF SYNTHETIC TURF AND FOR COVERING A SITE WITH SYNTHETIC TURF

(71) Applicant: WATERSHED GEOSYNTHETICS LLC, Alpharetta, GA (US)

(72) Inventors: Delaney Lewis, West Monroe, LA (US); Jose Urrutia, Suwanee, GA (US); Michael Ayers, Alpharetta, GA (US)

(73) Assignee: WATERSHED GEOSYNTHETICS LLC, Alpharetta, GA (US)

( * ) Notice: Subject to any disclaimer, the term of this patent is extended or adjusted under 35 U.S.C. 154(b) by 21 days.

(21) Appl. No.: 14/192,524

(22) Filed: Feb. 27, 2014

(65) Prior Publication Data

US 2014/0238589 A1   Aug. 28, 2014

Related U.S. Application Data (60) Provisional application No. 61/769,821, filed on Feb. 27, 2013.

(51) Int. Cl.
*E01C 13/08* (2006.01)
*D06H 5/00* (2006.01)

(52) U.S. Cl.
CPC *D06H 5/00* (2013.01); *E01C 13/08* (2013.01); *Y10T 156/1051* (2015.01)

(58) Field of Classification Search
None
See application file for complete search history.

(56) References Cited

U.S. PATENT DOCUMENTS

| | | | |
|---|---|---|---|
| 6,303,204 B2 | 10/2001 | Mathieson | |
| 7,175,362 B2 | 2/2007 | Carr et al. | |
| 7,838,096 B2 | 11/2010 | Hayes, II et al. | |
| 8,240,959 B1 | 8/2012 | Rhoades et al. | |
| 2002/0136846 A1 | 9/2002 | Prevost | |
| 2009/0169797 A1* | 7/2009 | Hayes et al. | 428/61 |
| 2010/0173102 A1* | 7/2010 | Van Reijen | 428/17 |
| 2012/0186729 A1 | 7/2012 | O'Connor et al. | |

OTHER PUBLICATIONS

International Search Report and the Written Opinion; Application No. PCT/US14/19117; May 27, 2014; 11 pages; International Searching Authority/United States, Alexandria, US.

* cited by examiner

*Primary Examiner* — Barbara J Musser
(74) *Attorney, Agent, or Firm* — Gardner Groff Greenwald & Villanueva, PC (57) ABSTRACT

A method for covering a site with synthetic turf includes laying down a first elongate strip of synthetic turf, laying down a second elongate strip of synthetic turf, with the second elongate strip of synthetic turf is laid down substantially adjacent to the first elongate strip of synthetic turf in a manner such that a portion of the second elongate strip partially overlays a portion of the first elongate strip forming a lap joint. The method also includes the step of applying heat and/or pressure to weld the first elongate strip of synthetic turf to the second elongate strip of synthetic turf along the lap joint.

13 Claims, 7 Drawing Sheets

METHODS FOR JOINING STRIPS OF SYNTHETIC TURF AND FOR COVERING A SITE WITH SYNTHETIC TURF

BACKGROUND OF THE INVENTION

The present invention relates to joining strips of synthetic turf together to form a larger, unitary synthetic turf covering, such as for various types of sites that need to be covered. Such coverings can be needed for erosion control, to cover mine tailings, to cover landfills, etc.

SUMMARY OF THE INVENTION

In a first example form, the present invention comprises a method for covering a site with synthetic turf. First, one lays down a first elongate strip of synthetic turf having synthetic tufts, the first elongate strip having a first elongate side edge and a second elongate side edge opposite the first elongate side edge. Next, one lays down a second elongate strip of synthetic turf having synthetic tufts, the second elongate strip having a first elongate side edge and a second elongate side edge opposite the first elongate side edge. The second elongate strip of synthetic turf is laid down substantially adjacent to the first elongate strip of synthetic turf in a manner such that a portion of the second elongate strip partially overlays or overlaps a portion of the first elongate strip forming a lap joint. Preferably, the lap joint is formed by folding a portion of the second elongate strip over and/or under and onto itself such that the elongate second strip is laid down in such a way that some synthetic tufts on the second elongate strip face downwardly and engage upwardly-facing tufts on the first elongate strip. In this way, synthetic tufts on the first and second elongate strips enmesh with one another. With some of the synthetic tufts on the first and second elongate strips enmeshed with one another and facing one another, one applies heat to the lap joint and as the heat is applied to the lap joint the synthetic tufts on the first and second elongate strips are welded to one another. This forms an intermediate bonding layer between the first and second elongate strips and is attached to both the first and second elongate strips.

Preferably, the step of applying heat includes applying heat and compressive force at the same time. Also preferably, the step of applying heat is accomplished by rolling a wheeled, portable heat welder apparatus over the lap joint and operating the wheeled, portable heat welder while rolling it over the lap joint.

Preferably, the synthetic turf comprises synthetic tufts extending from a top side of the turf. Optionally, the synthetic tufts are made from HDPE.

Optionally, one can lay down polymeric resin pellets, granules or other small bits of resin on the first elongate strip along the first side edge thereof. With heat applied to the lap joint the synthetic tufts on the first and second elongate strips are welded to one another. This bond can be aided by melting the small polymeric resin bits (such as pellets or granules) to bond the two layers to one another.

In another example form, the present invention comprises a method for covering a site with synthetic turf. This method includes the steps of laying down a first elongate strip of synthetic turf, with the first elongate strip having a first elongate side edge and a second elongate side edge opposite the first elongate side edge. The method also includes the step of laying down a second elongate strip of synthetic turf, the second elongate strip having a first elongate side edge and a second elongate side edge opposite the first elongate side edge. Preferably, the second elongate strip of synthetic turf is laid down substantially adjacent to the first elongate strip of synthetic turf in a manner such that a portion of the second elongate strip partially overlays a portion of the first elongate strip forming a lap joint. The method also includes the step of applying heat and/or pressure to weld the first elongate strip of synthetic turf to the second elongate strip of synthetic turf along the lap joint.

Optionally, the step of applying heat and/or pressure comprises applying heat and pressure. Preferably, the step of applying heat and/or pressure is accomplished by rolling a wheeled, portable heat welder apparatus over the lap joint and operating the wheeled, portable heat welder while rolling it over the lap joint. Preferably, the lap joint is formed by folding a portion of the second elongate strip over and onto itself such that the elongate second strip is laid down in such a manner that some synthetic tufts on the second elongate strip face downwardly and engage upwardly-facing tufts on the first elongate strip. In this way, synthetic tufts on the first and second elongate strips enmesh with one another and as the heat and/or pressure is applied to the lap joint the synthetic tufts on the first and second elongate strips are welded to one another.

In another example form, the present invention comprises a method for joining strips of synthetic turf to one another, with the synthetic turf being of the type having synthetic tufts. The method includes the steps of: (a) laying down a first strip of synthetic turf having synthetic tufts; (b) laying down a second strip of synthetic turf having synthetic tufts in a manner to have a portion of the second strip of synthetic turf overlap the first strip of synthetic turf; and (c) applying heat and force to the strips of synthetic turf where they overlap to bond the first strip to the second strip.

DESCRIPTION OF EXAMPLE EMBODIMENTS

Figure 1:
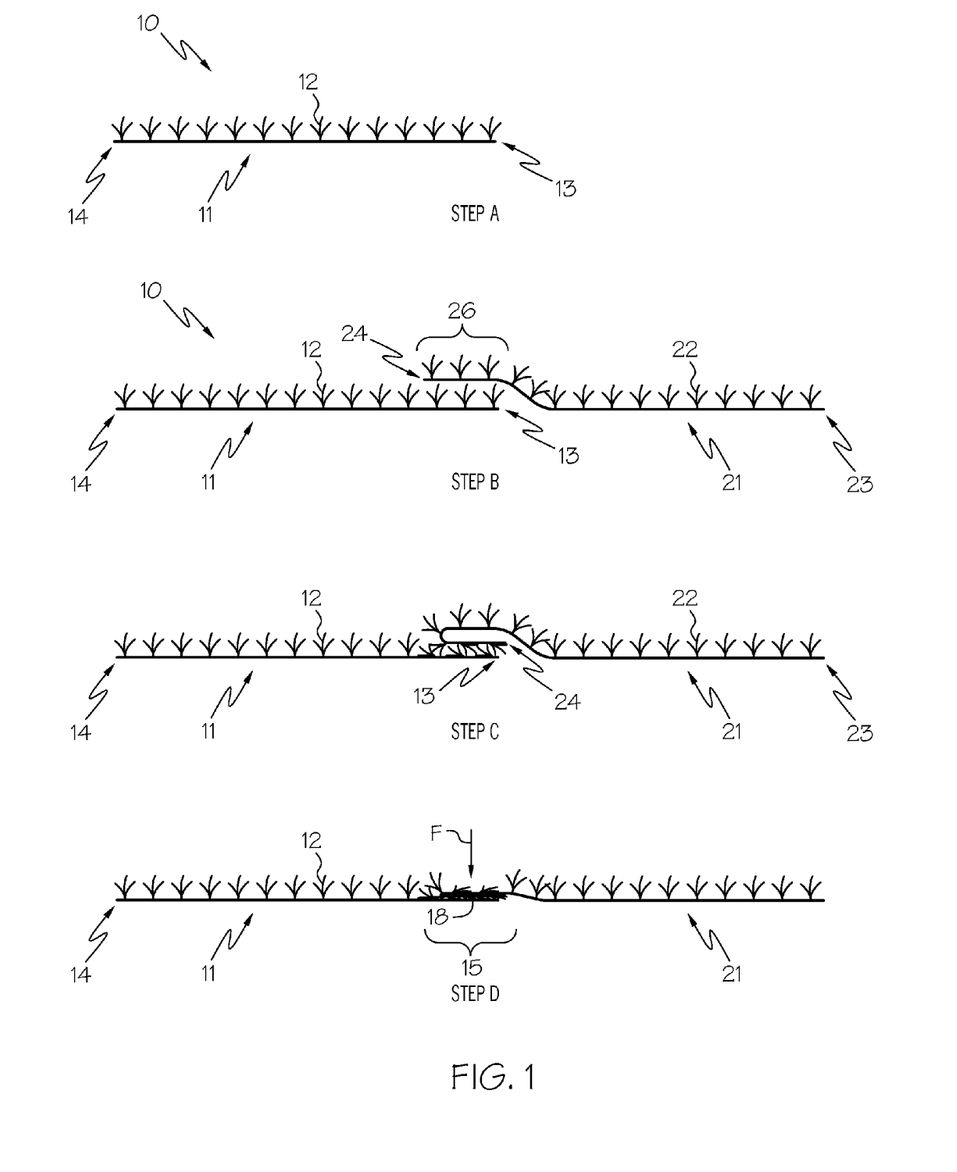
FIG. 1 is a schematic depiction of a process for covering a site with synthetic turf and for joining strips of synthetic turf together according to a first preferred form of the present invention.

As depicted in FIG. 1, in a first example form, the present invention comprises a method 10 for covering a site with synthetic turf. First, as shown in Step A, one lays down a first elongate strip 11 of synthetic turf having synthetic tufts 12, the first elongate strip having a first elongate side edge 13 and a second elongate side edge 14 opposite the first elongate side edge. Next as shown in Step B, one lays down a second elongate strip 21 of synthetic turf having synthetic tufts 22, the second elongate strip having a first elongate side edge 23 and a second elongate side edge 24 opposite the first elongate side edge. The second elongate strip of synthetic turf 21 is laid down substantially adjacent to the first elongate strip 11 of synthetic turf in a manner such that a portion 26 of the second elongate strip 21 partially overlays or overlaps a similar portion of the first elongate strip 11 forming a lap joint. Preferably, as shown in Step C, the lap joint is formed by folding a portion of the second elongate strip 21 over and/or under and onto itself such that the elongate second strip 21 is laid down in such a way that some synthetic tufts 22 on the second elongate strip 21 face downwardly and engage upwardly-facing tufts 12 on the first elongate strip 11. In this way, synthetic tufts on the first and second elongate strips enmesh with one another. With some of the synthetic tufts 12, 22 on the first and second elongate strips 11, 21 enmeshed with one another and facing one another, an operator applies heat to the lap joint and as the heat is applied to the lap joint the synthetic tufts on the first and second elongate strips are welded to one another. To aid in this, force F can be applied to the lap joint 15 during the heating or very shortly thereafter (while the lap joint is still quite warm). This forms an intermediate bonding layer 18 between the first and second elongate strips and is attached to both the first and second elongate strips, as shown in Step D.

Preferably, the step of applying heat includes applying heat and compressive force at the same time. Also preferably, the step of applying heat is accomplished by rolling a wheeled, portable heat welder apparatus over the lap joint and operating the wheeled, portable heat welder while rolling it over the lap joint. See FIG. 6 for an example of such a wheeled portable heat welder apparatus.

Preferably, the synthetic turf comprises synthetic tufts extending from a top side of the turf. Optionally, the synthetic tufts are made from HDPE.

Figure 2:
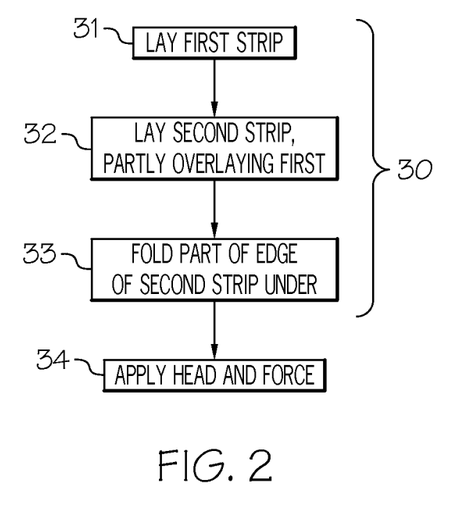
FIG. 2 is a flow chart depicting the steps of the process shown in FIG. 1.

As depicted in FIG. 2, in one form the present invention comprises a multi-step method of joining two strips of synthetic turf to one another to form a larger piece of synthetic turf, such as for covering a site. The method 30 shown in FIG. 2 includes a first step 31 of laying down a first strip of synthetic turf with synthetic tufts facing up. In the second step 32 one lays down a second strip of synthetic turf with synthetic tufts facing up and with part of the second strip overlaying (overlapping) the first strip. In the third step 33, part of the overlapping second strip is folded under so that some of the synthetic tufts face downwardly and engage some of the upwardly facing synthetic tufts on the first strip of synthetic turf. In the fourth step 34 heat and force is applied to the overlapping joint (lap joint) to weld the two strips of synthetic turf to one another. In this way, the synthetic tufts melt together to bond or fuse the two strips together.

In another example form, the present invention comprises a method for covering a site with synthetic turf. This method includes the steps of laying down a first elongate strip of synthetic turf, with the first elongate strip having a first elongate side edge and a second elongate side edge opposite the first elongate side edge. The method also includes the step of laying down a second elongate strip of synthetic turf, the second elongate strip having a first elongate side edge and a second elongate side edge opposite the first elongate side edge. Preferably, the second elongate strip of synthetic turf is laid down substantially adjacent to the first elongate strip of synthetic turf in a manner such that a portion of the second elongate strip partially overlays a portion of the first elongate strip forming a lap joint. The method also includes the step of applying heat and/or pressure to weld the first elongate strip to the second elongate strip. This can be done with the overlap portion of the second strip facing up or down. With the overlap portion of the second strip facing down, the synthetic tufts of the first strip are joined to the synthetic tufts of the second strip. Conversely, if the overlap portion of the second strip is facing up, the synthetic tufts of the first strip are joined to the underside of the second strip of synthetic turf.

For example, in one technique for creating the lap joint first one overlaps one edge of synthetic turf over another edge of a separate panel (or strip) of turf. Both panels or strips should be in a "tuft up" position and the amount of overlap width is dictated by the tensile strength desired. Once in place, heat and pressure is applied to the region between the two panels. This process bonds the melted tufts on the top of the bottom panel to the tuft loops on the bottom of the top panel. This type seam tends to rely on a tear resistance strength for tensile strength, as opposed to a peel resistance of the other heat bond technique. As a result, the seam strength can be manipulated by changing the width of the heat bonded area. This technique also provides a more aesthetically pleasing finished seam. This technique is depicted in FIG. 6.

Figure 6:
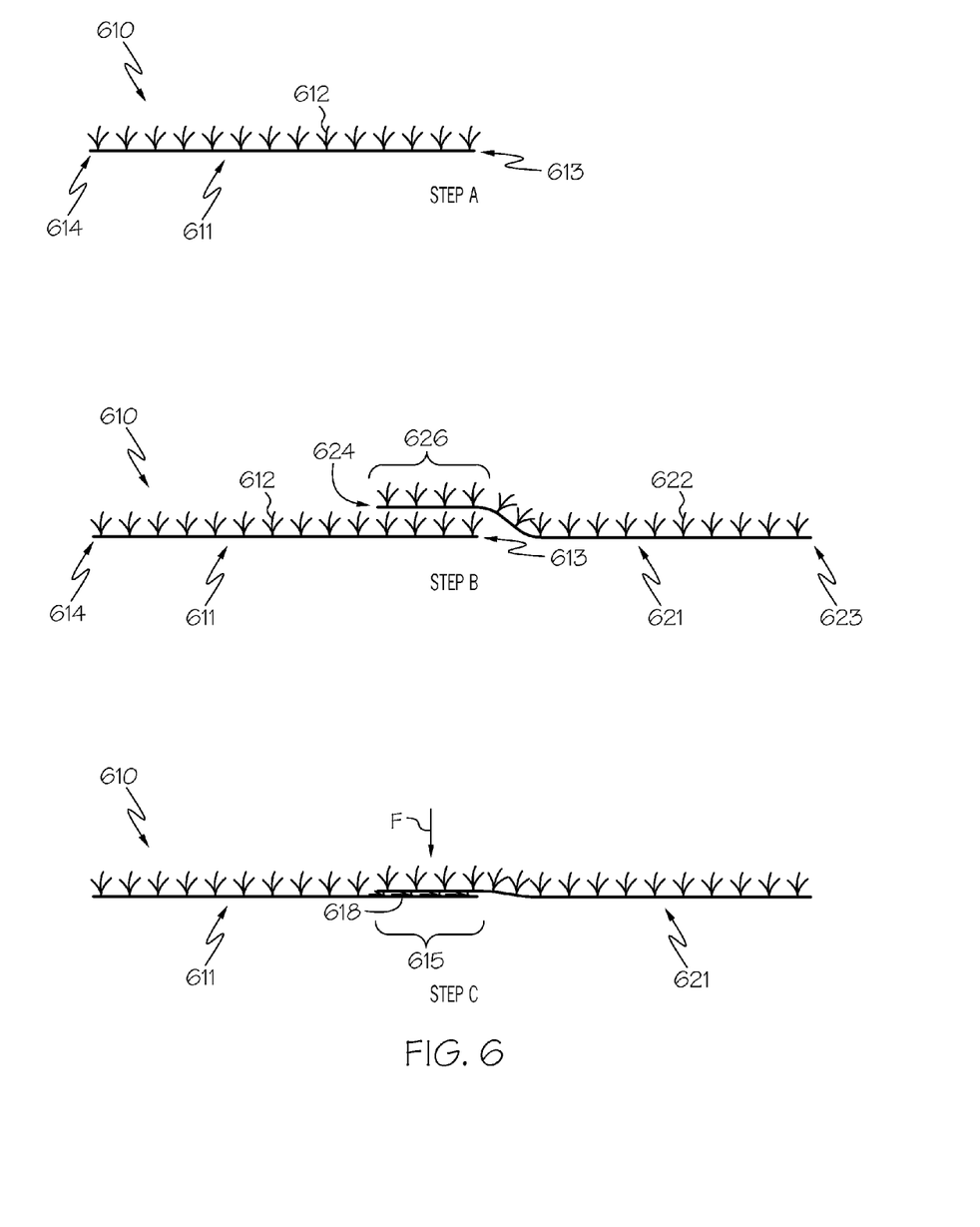
FIG. 6 is a schematic depiction of a process for covering a site with synthetic turf and for joining strips of synthetic turf together according to a fifth preferred form of the present invention.

As depicted in FIG. 6, the present invention further comprises a method 610 for covering a site with synthetic turf. First, as shown in Step A, one lays down a first elongate strip 611 of synthetic turf having synthetic tufts 612, the first elongate strip having a first elongate side edge 613 and a second elongate side edge 614 opposite the first elongate side edge. Next as shown in Step B, one lays down a second elongate strip 621 of synthetic turf having synthetic tufts 622, the second elongate strip having a first elongate side edge 623 and a second elongate side edge 624 opposite the first elongate side edge. The second elongate strip of synthetic turf 621 is laid down substantially adjacent to the first elongate strip 611 of synthetic turf in a manner such that a portion 626 of the second elongate strip 621 partially overlays or overlaps a similar portion of the first elongate strip 611 forming a lap joint. As shown in Step C, an operator applies heat to the lap joint and as the heat is applied to the lap joint the synthetic tufts on the first elongate strip are welded to the underside of the second elongate strip. To aid in this, force F can be applied to the lap joint 615 during the heating or very shortly thereafter (while the lap joint is still quite warm). This forms an intermediate bonding layer 618 between the first and second elongate strips and is attached to both the first and second elongate strips, as shown in Step C.

Figure 3:
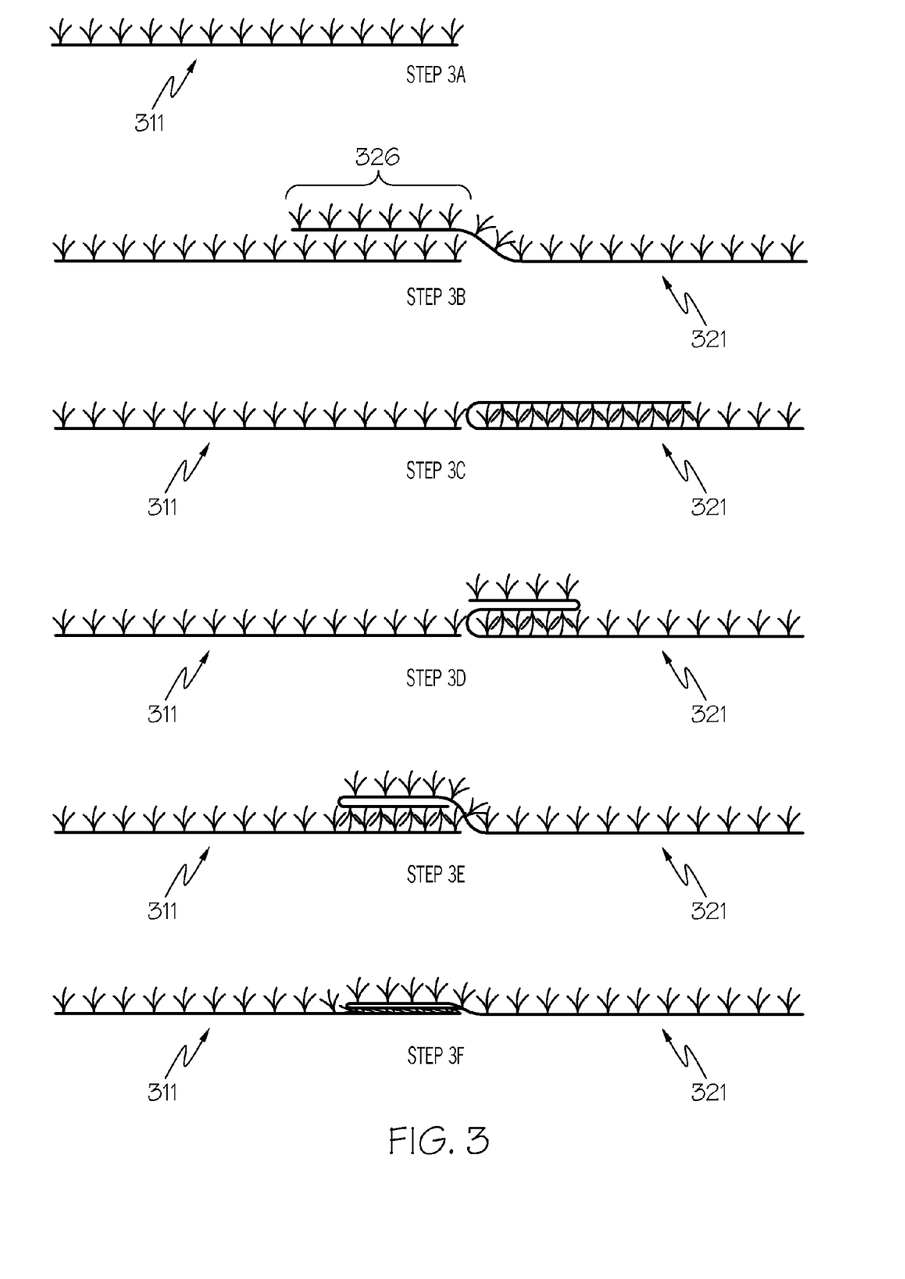
FIG. 3 is a schematic depiction of a process for covering a site with synthetic turf and for joining strips of synthetic turf together according to a second preferred form of the present invention.

The joint can be made in various forms prior to heat welding or bonding. For example, the lap joint can be prepared in any of several manners. FIG. 1 shows one way of preparing the lap joint. FIG. 3 shows another way of preparing the lap joint in which the initially-overlapping portion 326 of strip 321 is initially laid over the edge of strip 311 (see Steps 3A and 3B). Next, which the initially-overlapping portion 326 of strip 321 is folded back onto strip 321 (see Step 3C) and then folded in half onto itself (see Step 3D). This doubled (half-width) overlapping portion is then folded over onto strip 321 (see Step 3E) and the joint is then heated and pressed to weld the two strips of synthetic turf to one another, as shown in Step 3F.

Figure 4:
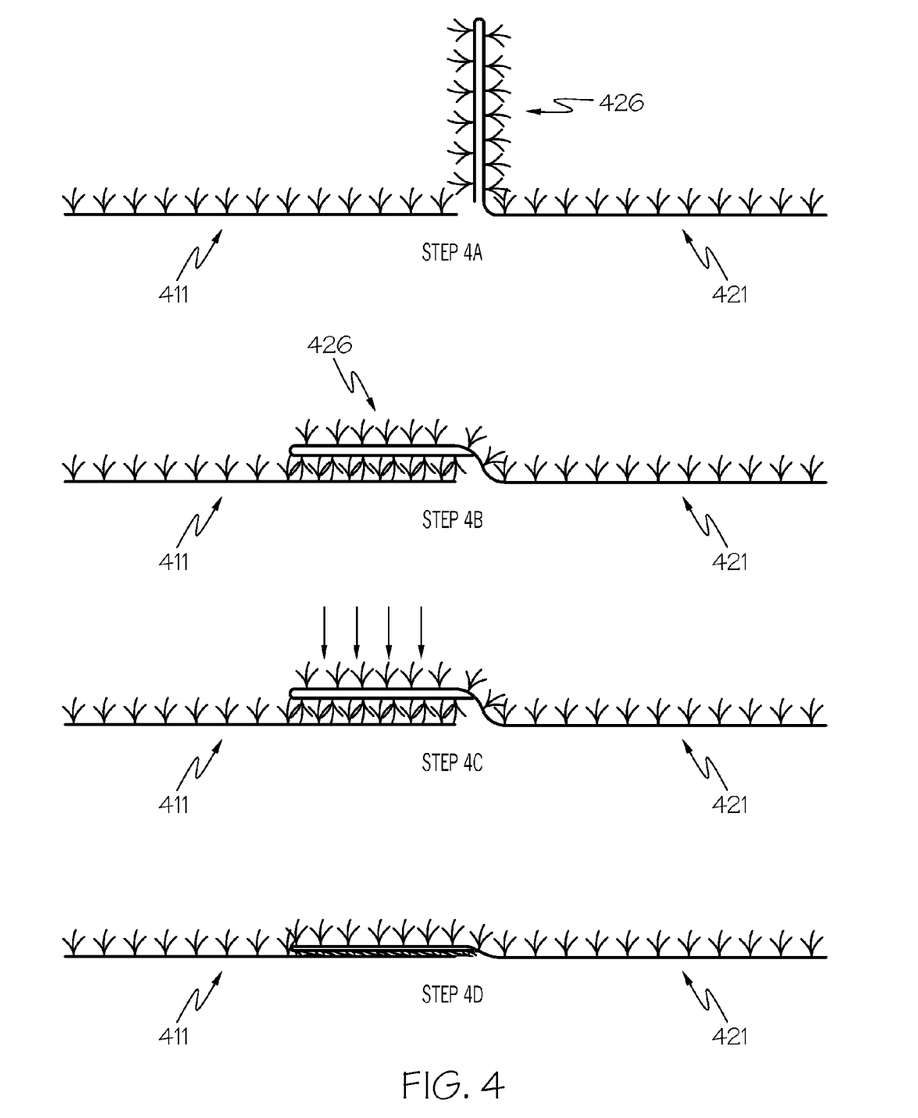
FIG. 4 is a schematic depiction of a process for covering a site with synthetic turf and for joining strips of synthetic turf together according to a third preferred form of the present invention.

FIG. 4 shows another way of preparing the lap joint in which the initially-overlapping portion 426 of strip 421 is initially folded over onto itself and then laid over the edge of strip 411 (see Steps 4A and 4B). This doubled (half-width) overlapping portion is lays over strip 421 and the joint is then heated and pressed to weld the two strips of synthetic turf to one another, as shown in Steps 4C and 4D.

Figure 5:
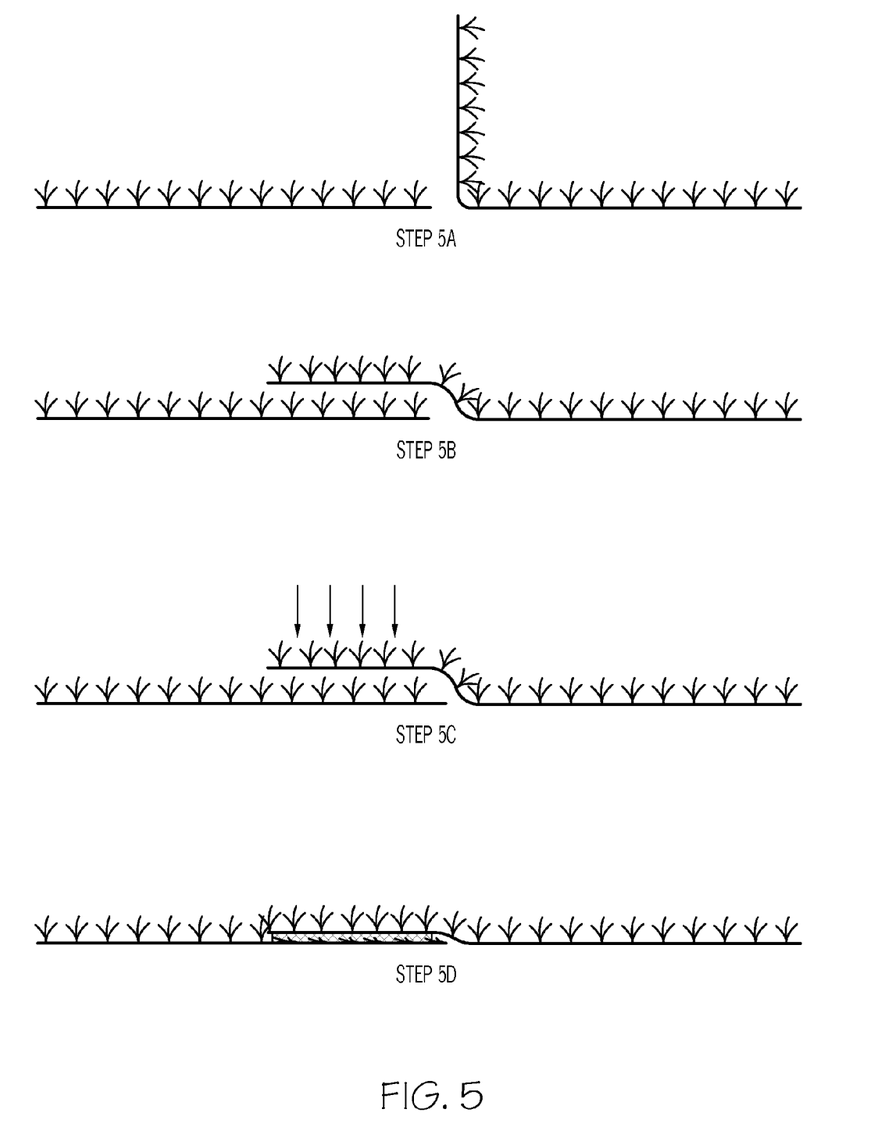
FIG. 5 is a schematic depiction of a process for covering a site with synthetic turf and for joining strips of synthetic turf together according to a fourth preferred form of the present invention.

FIG. 5 shows another way of preparing the lap joint between two adjacent elongated turf strips, with one overlapping the other at a predetermined length. The heat bond technique is performed by applying heat and pressure between the bottom of the top elongated strip and the top of the bottom elongated strip where the two elongated strips contact one another. This heat bond technique uses a different temperature applied to the bottom of the top elongated strip because the polypropylene geotextile is more heat sensitive and can be easily damaged if exposed to the same temperatures as the top of the bottom elongated turf strip with the tufts facing up. Heat is applied to this elongated strip in order to heat the HDPE loops so that it can be successfully bonded to the adjacent elongated turf strip. The HDPE tufts on the top of the bottom elongated strip require a higher heat to prepare them for a correct heat bond seam. The different applied temperatures for this heat bond technique are achieved by modifying the Leister Varimat V2 with a heat restrictor on the top of the heat plate. This allows the Varimat V2 to apply the necessary different temperatures to the two different elongated turf strips at the same time to create a successful seam. This is the most aesthetically pleasing of the different heat bond seams. Moreover, the strength of the seam can be increased by varying the width of the heat bond area or adding a binder to the infill that will drastically increase the friction resistance of the seam.

Various hot air seam welders can be employed. After some searching and evaluation, a Varimat unit from Leister Neely-Brown of Atlanta was found to be generally adaptable for the present invention. The machine has been modified to perform the heat bond technique depicted in FIG. 6, the technique as described applies heat to the top of one elongate turf strip simultaneously with the bottom of another elongate turf strip at different temperatures. The reason being, as mentioned in the earlier observations of developing the heat bond seam techniques, the HDPE tufts on the top side of the turf material and the polypropylene geotextile on the back of the turf material are heat affected at different temperatures. The polypropylene geotextile can be damaged easily if the same temperature is applied for the same exposure time as to the HDPE tufts. To correctly perform this heat bond seam technique without damaging the underlying polypropylene geotextile a heat deflector plate was installed to the top of the heat plate on the Varimat V2. This allows the machine to apply the different (correct) temperatures and exposure time to each side necessary to perform a correct heat bond without damaging either elongate strip.

Figure 7:
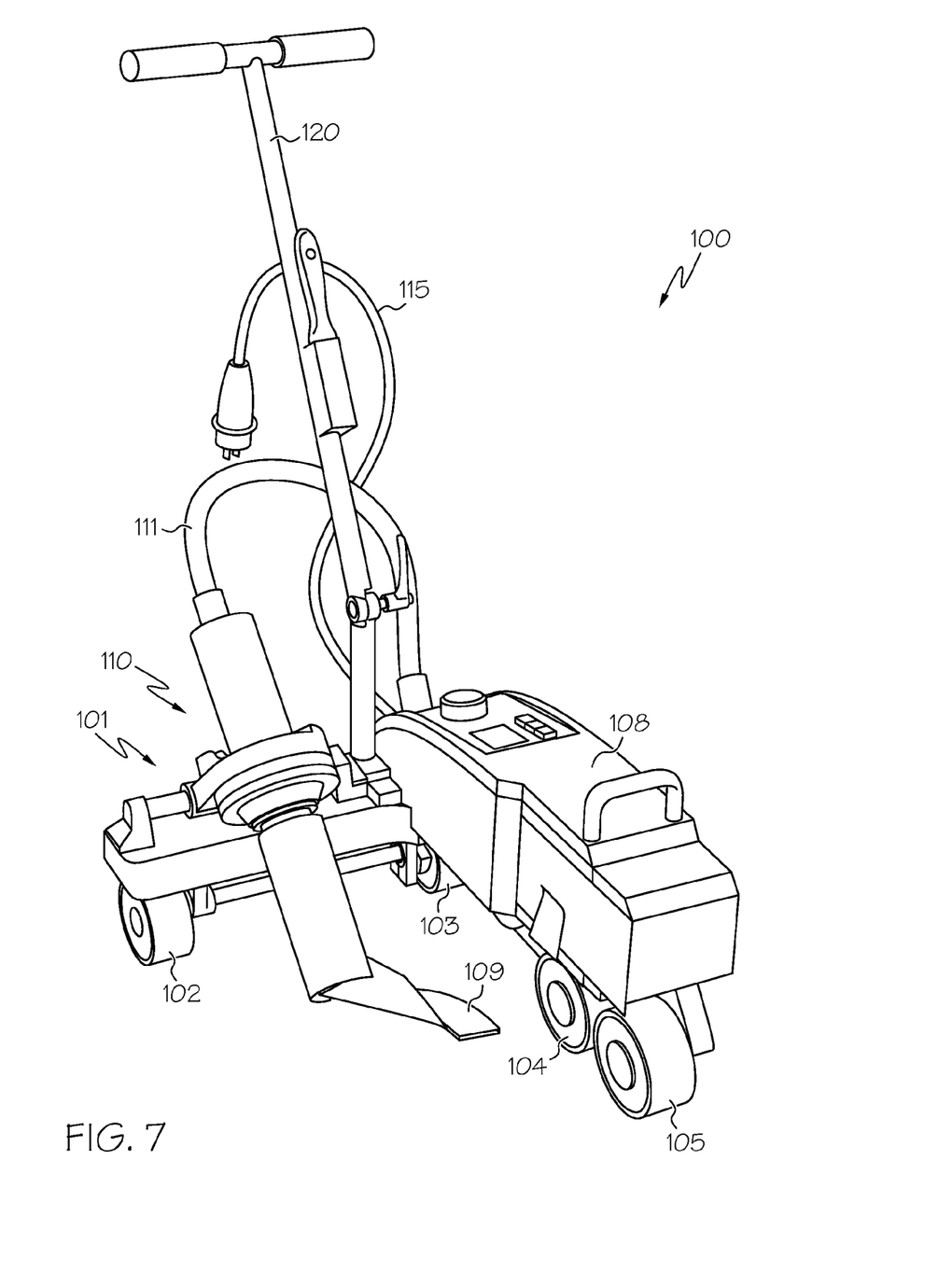
FIG. 7 is a perspective illustration of an example seam welding apparatus for use with the methods of the present invention.

As shown in FIG. 7, such a seam welder 100 includes a frame 101 supported upon wheels 102, 103, 104, and 105. The seam welder 100 also includes a cabinet 108 and a hot air blower 110, typically powered by electricity through electrical cord 111. The electric cord 111 connects the internal circuitry in the cabinet 108 with the hot air blower 110. A power cord 115 connects the internal circuitry with a source of electric power. Typically, in the field this source of electric power will be a portable electric generator. An adjustable upright T-handle 120 provides a convenient means for guiding the seam welder 100. Various controls (such as for surface speed, air temperature, etc) are provided on the face of the cabinet 108. A blade 109 provides a small air space as the seam welder is moved along the seam between the overlapping strips of synthetic turf.

When covering sites with synthetic turf, it is common to lay the synthetic turf down in relatively long, relative narrow strips (the strips often are only several feet wide). This relative slimness (high aspect ratio) tends to make the strips susceptible to disturbance by wind, water, gravity, and other forces. To combat this susceptibility to disturbance, the present inventor sought to bind together multiple strips of synthetic turf into larger patches of synthetic turf, thereby decreasing the aspect ratio and increasing the stability of the turf. The investigation proceeded as follows.

Initially, simply gluing adjacent strips of synthetic turf together using hot melt glue was investigated. The hot melt glue seam procedure worked somewhat well in field applications because of its ease of use and high productivity, but ultimately could not maintain sufficient strength when exposed to the environment and ambient heat. Next, Nordot® glue (from Synthetic Surfaces, Inc., of Scotch Plains, N.J.) was tried in an effort to produce glued seams and this technique performed very well in laboratory testing, even when exposed to temperatures equal to those the seams would be exposed to in the environment. However, the Nordot® glue is rather expensive, messy, and productivity was rather low. Overall, this was cost prohibitive.

Knowing that the above-mentioned options were not meeting the need for a high-production, cost-effective seam that could retain its strength in virtually all conditions, the investigation turned to the synthetic turf materials themselves, which often includes polypropylene textile and polyethylene tufts. An initial line of investigation was to heat bond two separate pieces of turf together by heating (using a hand-held heat gun) two pieces of polypropylene geotextile then pressing them together (using body weight). This process failed immediately, as the polypropylene when heated would shrink and deform immediately and could not be pressed together to form a heat bond. However, during this testing of bonding the polypropylene geotextile, it was observed that the polyethylene tufts melted with a lot less exposure to the hand-held heat gun than did the polypropylene geotextile.

The experimentation then focused on taking two pieces of synthetic turf, heating them, pressing them together facing one another. This process seemed to work, and it was observed that one could melt the polyethylene tufts down to the polypropylene geotextile on each separate piece without harming the polypropylene or the tuft loops on the back side of the polypropylene geotextile. After letting the two pieces of turf (geotextiles) cool for approximately 5 minutes, the now single piece of geotextile was inspected closely. The material was a lot stiffer in the area between the two geotextiles, and it could not be pulled apart by hand. The inventor then cut through the area to inspect the inside of the heat bonded area and what was noticed was that as all of the tufts had been melted and pressed together, the polyethylene material had been reformed more or less into a sheet between the two pieces of polypropylene geotextile. Significantly, the turf loops (tufts) that penetrate through the geotextile were still intact on the loop side and as a result of the heat bond were now connected to the polyethylene sheet between the two polypropylene geotextiles. The next step in the inquiry was to make a seam with this process that could be conveyed into the field. This was accomplished by taking two separate pieces (2 ft by 4 ft) of synthetic turf with the tufts facing up, overlapping one over the other by about six inches on the outside edge, then tucking 3 inches of the overlap under itself. The purpose was to replicate the procedure used earlier of having the two separate pieces of turf facing each other while also making this into a seam that could be replicated in the field. This was also done in an attempt to increase the amount of pressure applied to the seam immediately after heating, and this was achieved this by using a small rubber wheel (12 inch diameter by 2½ inches wide) to aid in pressing the heated material.

Once the procedure was completed it was observed that the seam appeared visually to be of good quality and could significantly increase production in the field over the Nordot® glue. Advantageously, this is a polyethylene bond and retains its strength in any virtually conditions where synthetic turf applications are to be found.

Next, bond strengths were investigated. So a sample was sent to SGI Labs (SGI Testing Services, LLC of Norcross, Ga.) for testing. The bond strengths obtained were deemed sufficient. Having established a workable hand method for bonding adjacent strips of synthetic turf, the investigation turned to finding a machine that could speed the process.

Further testing and evaluation revealed that temperature, speed and heat blower volumes can cause differences in performance. After much testing, we have found that operating at or near the following parameters generally provides satisfactory results. As the weather begins to warm during the day, the turf begins to heat as well causing for a decrease in required heating temperature. If one doesn't decrease the heating temperature throughout the day as the ambient air warms during the day, one can find that the tufts melt too fast. The reason for the difference is that typically in the morning there is dew on the turf and will need a higher temp to burn the dew and grass.

Example 1

Morning dew; ambient temp 55 F; operated at 10 ft per minute; operated at 860 degrees with 70 scfm blower speed.

Example 2

Early afternoon (no dew); ambient temp 67 F; 21 ft per minute; 752 degrees; 70 scfm blower speed.

Example 3

Late afternoon (no dew); ambient temp 76 F degrees; 22 ft per minute; 716 degrees; 70 scfm blower speed.

Optionally, one can lay down polymeric resin pellets, granules or other small bits of resin on the first elongate strip along the first side edge thereof. With heat applied to the lap joint the synthetic tufts on the first and second elongate strips are welded to one another. This bond can be aided by melting the small polymeric resin bits (such as pellets or granules) to bond the two layers to one another.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A method for joining strips of synthetic turf to one another, the synthetic turf of the type having synthetic tufts, and the method comprising the steps of:
   laying down a first strip of synthetic turf having synthetic tufts;
   laying down a second strip of synthetic turf having synthetic tufts in a manner to have a portion of the second strip of synthetic turf overlap a portion of the first strip of synthetic turf; and
   applying heat and force to the strips of synthetic turf where they overlap to bond the first strip to the second strip, wherein the synthetic tufts of the first strip are bonded to the synthetic tufts of the second strip.

2. A method as claimed in claim 1 wherein the step of laying down a second strip of synthetic turf comprises laying the second strip down in such a manner that some of the synthetic tufts thereof face downwardly and engage upwardly facing synthetic tufts of the first strip of synthetic turf.

3. A method as claimed in claim 1, wherein the bonded synthetic tufts of the overlapping portion of the first strip comprise synthetic tufts on a top of the first strip, and wherein the bonded synthetic tufts of the overlapping portion of the second strip comprise synthetic tuft loops of a bottom of the second strip.

4. A method for covering a site with synthetic turf, comprising the steps of:
   laying down a first elongate strip of synthetic turf having synthetic tufts, the first elongate strip having a first elongate side edge and a second elongate side edge opposite the first elongate side edge;
   laying down a second elongate strip of synthetic turf having synthetic tufts, the second elongate strip having a first elongate side edge and a second elongate side edge opposite the first elongate side edge, wherein the second elongate strip of synthetic turf is laid down substantially adjacent to the first elongate strip of synthetic turf in a manner such that a portion of the second elongate strip partially overlays a portion of the first elongate strip forming a lap joint, wherein the lap joint is formed by folding a portion of the second elongate strip over and onto itself such that the elongate second strip is laid down in such a way that some synthetic tufts on the second elongate strip face downwardly and engage upwardly-facing tufts on the first elongate strip, whereby synthetic tufts on the first and second elongate strips enmesh with one another
   applying heat to the lap joint and as the heat is applied to the lap joint the synthetic tufts on the first and second elongate strips are welded to one another to form an intermediate bonding layer between the first and second elongate strips and wherein the intermediate bonding layer is attached to both the first and second elongate strips.

5. A method as claimed in claim 4 wherein the step of applying heat comprises applying heat and compressive force at the same time.

6. A method as claimed in claim 4 wherein the step of applying heat is accomplished by rolling a wheeled, portable heat welder apparatus over the lap joint and operating the wheeled, portable heat welder while rolling it over the lap joint.

7. A method as claimed in claim 4 wherein the synthetic turf comprises synthetic tufts extending from a top side of the turf.

8. A method as claimed in claim 7 wherein the synthetic tufts comprise HDPE.

9. A method for covering a site with synthetic turf, comprising the steps of:

laying down a first elongate strip of synthetic turf, the first elongate strip having a first elongate side edge and a second elongate side edge opposite the first elongate side edge;

laying down a second elongate strip of synthetic turf, the second elongate strip having a first elongate side edge and a second elongate side edge opposite the first elongate side edge, wherein the second elongate strip of synthetic turf is laid down substantially adjacent to the first elongate strip of synthetic turf in a manner such that a portion of the second elongate strip partially overlays a portion of the first elongate strip forming a by joint; and applying heat and/or pressure to weld the first elongate strip of synthetic turf to the second elongate strip of synthetic turf along the lap joint, wherein the synthetic turf comprises synthetic tufts extending from a top side of the turf, and wherein the lap joint is formed by folding a portion of the second elongate strip over and onto itself such that the elongate second strip is laid down in such a manner that some synthetic tufts on the second elongate strip face downwardly and engage upwardly-facing tufts on the first elongate strip, whereby synthetic tufts on the first and second elongate strips enmesh with one another and as the heat and/or pressure is applied to the lap joint the synthetic tufts on the first and second elongate strips are welded to one another.

10. A method as claimed in claim 9 wherein the step of applying heat and/or pressure comprises applying heat and pressure.

11. A method as claimed in claim 9 wherein the step of applying heat and/or pressure is accomplished by rolling a wheeled, portable heat welder apparatus over the lap joint and operating the wheeled, portable heat welder while rolling it over the lap joint.

12. A method as claimed in claim 9 wherein the synthetic tufts on the first and second elongate strips are welded to one another to form an intermediate bonding layer between the first and second elongate strips and wherein the intermediate bonding layer is attached to both the first and second elongate strips.

13. A method as claimed in claim 9 wherein the synthetic tufts comprise HDPE.

\* \* \* \* \*